United States Patent
Sharma et al.

(10) Patent No.: US 9,652,716 B2
(45) Date of Patent: May 16, 2017

(54) EXTRACTING INTERPRETABLE FEATURES FOR CLASSIFICATION OF MULTIVARIATE TIME SERIES FROM PHYSICAL SYSTEMS

(71) Applicant: NEC Laboratories America, Inc., Princeton, NJ (US)

(72) Inventors: Abhishek Sharma, Philadelphia, PA (US); Haifeng Chen, Old Bridge, NJ (US); Guofei Jiang, Princeton, NJ (US); Om Prasad Patri, Los Angeles, CA (US)

(73) Assignee: NEC Corporation, Tokyo (JP)

( * ) Notice: Subject to any disclaimer, the term of this patent is extended or adjusted under 35 U.S.C. 154(b) by 283 days.

(21) Appl. No.: 14/527,413

(22) Filed: Oct. 29, 2014

(65) Prior Publication Data

US 2015/0235139 A1 Aug. 20, 2015

Related U.S. Application Data

(60) Provisional application No. 61/942,382, filed on Feb. 20, 2014.

(51) Int. Cl.
*G06F 15/00* (2006.01)
*G06F 15/18* (2006.01)
(Continued)

(52) U.S. Cl.
CPC ............. *G06N 5/043* (2013.01); *G06N 5/003* (2013.01)

(58) Field of Classification Search
CPC ........ G06N 5/003; G06N 5/043; G06K 9/527; G06K 9/6255; G06F 15/00; G06F 15/18
(Continued)

(56) References Cited

U.S. PATENT DOCUMENTS

| 5,930,392 A * | 7/1999 | Ho ........................ G06K 9/6228 382/224 |
| 6,351,561 B1 * | 2/2002 | Iyengar ................ G06K 9/6282 382/226 |
| 2013/0058535 A1 * | 3/2013 | Othmezouri ........ G06K 9/00369 382/103 |

OTHER PUBLICATIONS

'Time Series Shapelets: A New Primitive for Data Mining': Ye, KDD, 2009, ACM, 978-1-60558-495.*

(Continued)

*Primary Examiner* — Stanley K Hill
*Assistant Examiner* — Peter Coughlan
(74) *Attorney, Agent, or Firm* — Joseph Kolodka

(57) ABSTRACT

A method and system are provided. The method includes extracting shapelets from each of a plurality of time series dimensions of multi-dimensional time series data. The method further includes building a plurality of decision-tree classifiers, one for each time series dimension, responsive to the shapelets extracted therefrom. The method also includes generating a pairwise similarity matrix between respective different ones of the plurality of time series dimensions using the shapelets as intermediaries for determining similarity. The method additionally includes applying a feature selection technique to the matrix to determine respective feature weights for each of shapelet features of the shapelets and respective classifier weights for each of the decision-tree classifiers that uses the shapelet features. The method further includes combining decisions issued from the decision-tree classifiers to generate a final verdict of classification for a time series dimension responsive to the respective feature weights and the respective classifier weights.

14 Claims, 6 Drawing Sheets

(51) Int. Cl.
*G06N 5/04* (2006.01)
*G06N 5/00* (2006.01)

(58) Field of Classification Search
USPC .......................................................... 706/62
See application file for complete search history.

(56) References Cited

OTHER PUBLICATIONS

'Time series shapelets: a novel technique that allows accurate, interpretable and fast classification': Ye, Univ of California, 2010.*

Ghalwash, M., et al. "Early classification of multivariate temporal observations by extraction of interpretable shapelets" BMC Bioinformatics. vol. 13, No. 195. Aug. 2012. pp. 1-12.

Ghalwash, M., et al. "Extraction of Interpretable Multivariate Patterns for Early Diagnostics" 2013 IEEE 13th International Conference on Data Mining. Dec. 2013. pp. 201-210.

Hu, B., et al. "Classification of Multi-Dimensional Streaming Time Series by Weighting each Classifier's Track Record" 2013 IEEE 13th International Conference on Data Mining. Dec. 2013. (10 Pages).

Xing, Z., et al. "Extracting Interpretable Features for Early Classication on Time Series*" Proceedings of the Eleventh SIAM International Conference on Data Mining, Session S5—Feature Selection and Dimensionality Reduction. Apr. 2011. pp. 247-258.

Ye, L., et al. "Time Series Shapelets: A New Primitive for Data Mining" KDD'09. Jun. 2009. (9 Pages).

* cited by examiner

EXTRACTING INTERPRETABLE FEATURES FOR CLASSIFICATION OF MULTIVARIATE TIME SERIES FROM PHYSICAL SYSTEMS

RELATED APPLICATION INFORMATION

This application claims priority to provisional application Ser. No. 61/942,382 filed on Feb. 20, 2014, incorporated herein by reference.

BACKGROUND

Technical Field

The present invention relates to data processing, and more particularly to extracting interpretable features for classification of multivariate time series from physical systems.

Description of the Related Art

Previous approaches for time series classification, clustering and signature extraction have focused primarily on the univariate case, i.e. when each instance includes a single time series. These can be organized into the following two themes: global; and local. Global techniques consider the entire time series data at once and extract either similarity based features (e.g., Euclidean distance or Dynamic Time Warping distance between two time series) or interval based features (e.g., the mean, variance, minimum or maximum value over a sliding time window). These features are then used as input to standard classifiers such as Support Vector Machines (SVMs), decision trees, and so forth or to clustering algorithms like K-means. Local techniques aim to extract subsequences of the original time series as features. These subsequences are called shapelets because they correspond to shapes embedded within a large time series that are useful for discriminating between univariate time series from different classes or as a similarity measure between time series for clustering.

Univariate shapelets have been used for early classification of time series. The main idea here is to balance the discriminative power of a shapelet against when it occurs in time series data collected during an online setting with preference for shapelets that occur early in time series data.

With regard to event extraction and event pattern mining from time series, traditional approaches have relied on change point detection based approaches to define events, and then use standard frequent and sequential pattern mining algorithms to extract event patterns. Such approaches only work for instantaneous events that occur at a single time point. Recent work has extracted events that occur over an interval from time series data. These interval events are extracted using time series values, e.g., a "high" ("low") event occurs when values are above (below) a threshold, linearly increasing value event, and so forth.

SUMMARY

These and other drawbacks and disadvantages of the prior art are addressed by the present principles, which are directed to extracting interpretable features for classification of multivariate time series from physical systems.

According to an aspect of the present principles, a method is provided. The method includes extracting shapelets from each of a plurality of time series dimensions of multi-dimensional time series data. The method further includes building a plurality of decision-tree classifiers, one for each of the plurality of time series dimensions, responsive to the shapelets extracted therefrom. The method also includes generating a pairwise similarity matrix between respective different ones of the plurality of time series dimensions using the shapelets as intermediaries for determining similarity. The method additionally includes applying a feature selection technique to the pairwise similarity matrix to determine respective feature weights for each of shapelet features of the shapelets and respective classifier weights for each of the plurality of decision-tree classifiers that uses the shapelet features. The method further includes combining decisions issued from the plurality of decision-tree classifiers to generate a final verdict of classification for a time series dimension responsive to the respective feature weights and the respective classifier weights.

According to another aspect of the present principles, a system is provided. The system includes a shapelet extractor for extracting shapelets from each of a plurality of time series dimensions of multi-dimensional time series data. The system further includes a processor-based decision-tree classifier builder for building a plurality of decision-tree classifiers, one for each of the plurality of time series dimensions, responsive to the shapelets extracted therefrom. The system also includes a pairwise similarity matrix generator for generating a pairwise similarity matrix between respective different ones of the plurality of time series dimensions using the shapelets as intermediaries for determining similarity. The system additionally includes a processor-based feature selector for applying a feature selection technique to the pairwise similarity matrix to determine respective feature weights for each of shapelet features of the shapelets and respective classifier weights for each of the plurality of decision-tree classifiers that uses the shapelet features. The system further includes a weighted voting device for combining decisions issued from the plurality of decision-tree classifiers to generate a final verdict of classification for a time series dimension responsive to the respective feature weights and the respective classifier weights.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 5 is a block diagram showing an exemplary first candidate subsequence 500 plotted by its distances from normal time series and abnormal time series on the real line;

FIG. 6 is a block diagram showing an exemplary second candidate subsequence 600 plotted by its distances from normal time series and abnormal time series on the real line.

DETAILED DESCRIPTION OF PREFERRED EMBODIMENTS

The present principles are directed to extracting interpretable features for classification of multivariate time series from physical systems. A time series is a continuous sequence of n real-valued numbers. A multivariate time series, also referred to as a multi-dimensional time series, is a set of m time series. A respective dimension in the multi-dimensional time series is a respective one of the time series. A shapelet is a subsequence of a time series that corresponds to a particular shape. The present principles are applicable to shapelets having different characteristics such as, for example, different lengths and/or different starting times and/or different ending times.

We propose a novel solution to three problems related to knowledge extraction from multivariate time series data: (1) classification; (2) signature extraction; and (3) event pattern mining.

More specifically, the data includes multiple instances with each instance including multivariate time series data (e.g., from several sensors monitoring a car or a manufacturing plant). These instances are labeled, e.g. marked normal or faulty, by a domain expert. For the case when instances are labeled, i.e. supervised learning case, there are two important problems: (1) extract features that can be used to construct classifiers to distinguish between different labels (e.g., normal vs. faulty), and (2) define events, and learn patterns of these events for early classification in an online setting. Achieving the later goal can involve an early classification vs. accuracy trade-off. Signature extraction is also applicable when we have labeled data from only one class (e.g., only normal data) or when the labeled instances are unbalanced across classes (e.g., majority of the instances are normal and only few are abnormal).

Figure 1:
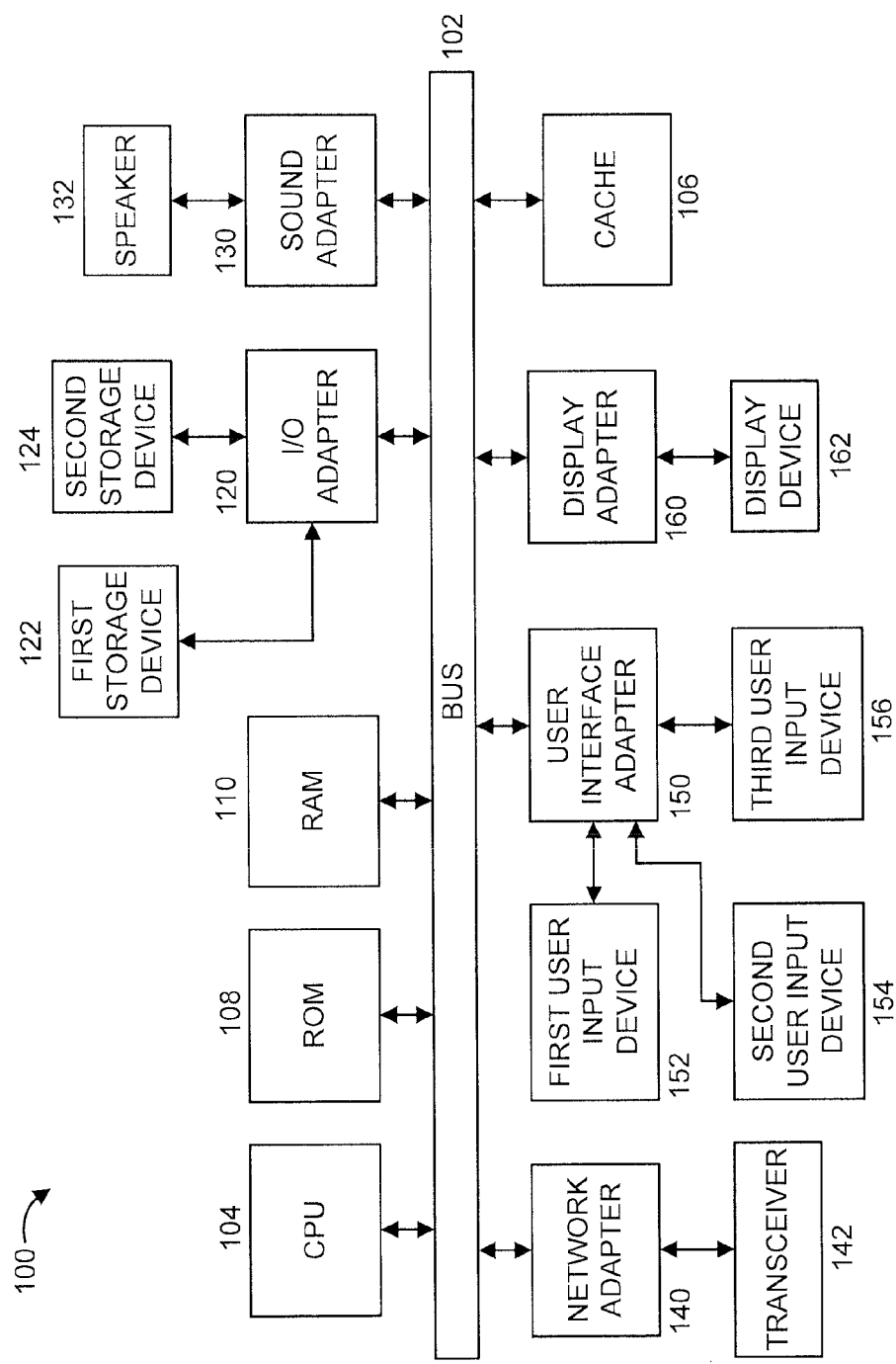
FIG. 1 is a block diagram showing an exemplary processing system 100 to which the present principles may be applied, according to an embodiment of the present principles.

FIG. 1 is a block diagram showing an exemplary processing system 100 to which the present principles may be applied, according to an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
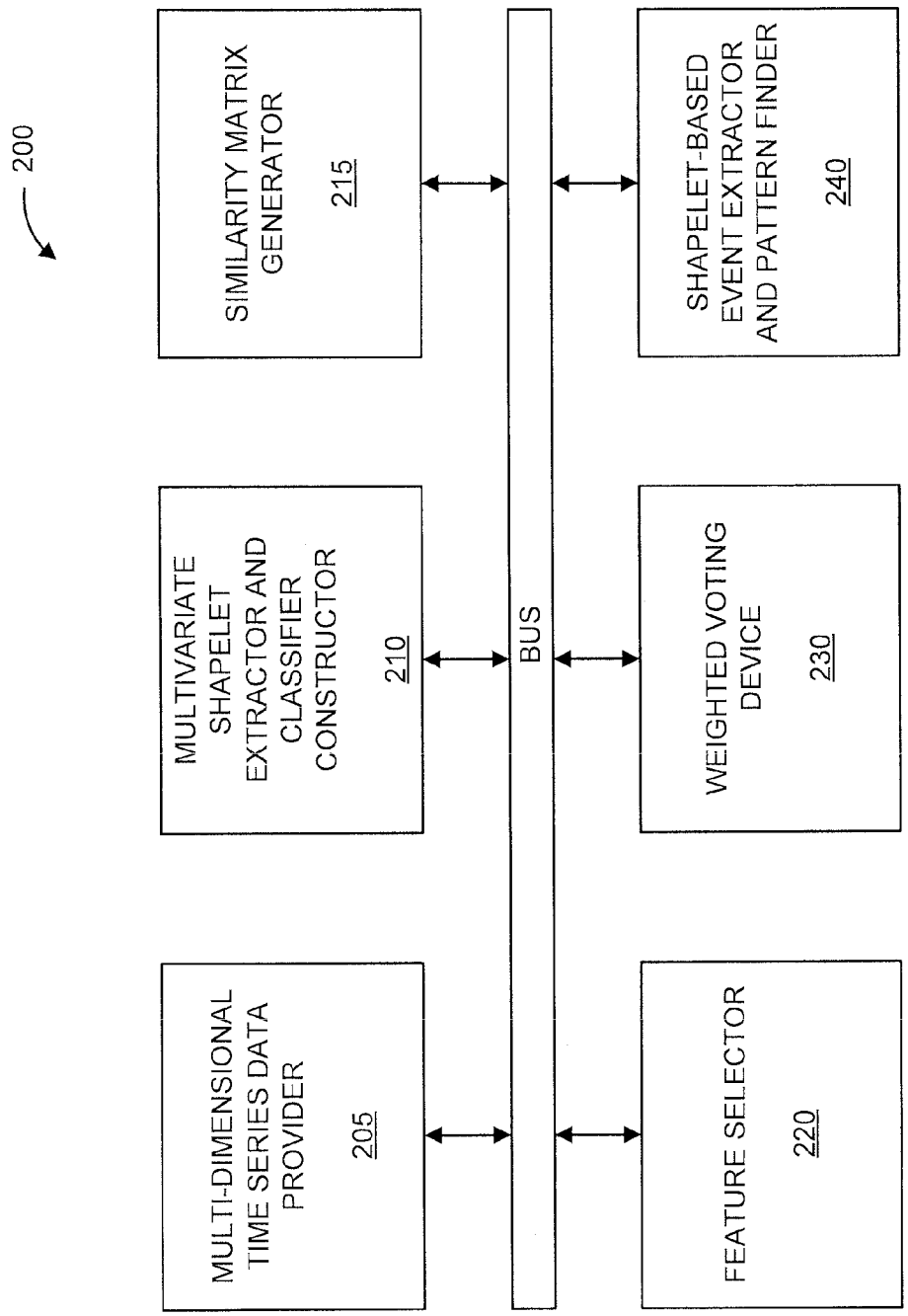
FIG. 2 is a block diagram showing an exemplary system 200 for extracting interpretable features for classification of multivariate time series from physical systems, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
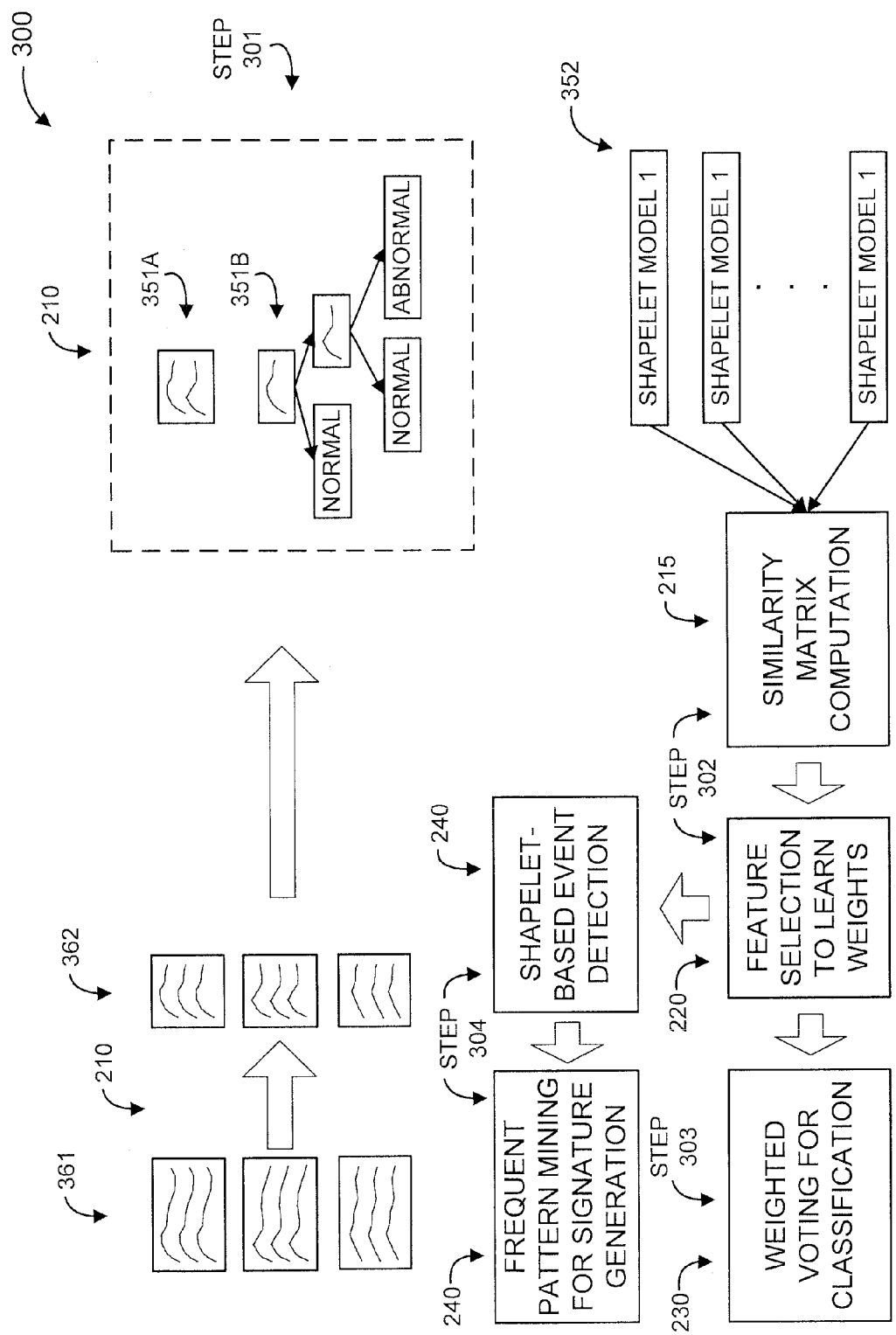
FIG. 3 is a high-level block diagram showing an exemplary method 300 for extracting interpretable features for classification of multivariate time series from physical systems, in accordance with an embodiment of the present principles.

Further, it is to be appreciated that processing system 100 may perform at least part of the methods described herein including, for example, at least part of method 300 of FIG. 3. Similarly, part or all of system 200 may be used to perform at least part of method 300 of FIG. 3.

FIG. 2 is a block diagram showing an exemplary system 200 for extracting interpretable features for classification of multivariate time series from physical systems, in accordance with an embodiment of the present principles. The system 200 includes multi-dimensional time series provider 205, a multivariate shapelet extractor and classifier constructor 210, a similarity matrix generator 215, a feature selector 220, a weighted voting device 230, and a shapelet-based event extractor and pattern finder 240.

In an embodiment, the multi-dimensional time series provider 205 provides multi-dimensional time series data. In an embodiment, the multi-dimensional time series provider 205 can be one or more sensors. In another embodiment, the multi-dimensional time series data can be generated by another system and provided to system 200 for processing. In such a case, the multi-dimensional time series provider 205 can be an input device and/or so forth as readily appreciated by one of ordinary skill in the art.

In an embodiment, at least one of the multivariate shapelet extractor and classifier constructor 210, the feature selector 220, the weighted voting device 230, and the shapelet-based event extractor and pattern finder 240 are processor-based.

In the embodiment of FIG. 2, the elements of system 200 are interconnected using a bus 201. However, in other embodiments, other forms of connection can also be used as readily appreciated by one of ordinary skill in the art, while maintaining the spirit of the present principles.

Moreover, while element 210 is shown in FIG. 2 as a multivariate shapelet extractor and classifier constructor, in another embodiment the functions of shapelet extraction and classifier constructing can be implemented by separate elements. Similarly, while element 240 is shown in FIG. 2 as a shapelet-based event extractor and pattern finder 240, in another embodiment the functions of shapelet-based event extraction and pattern finding can be implement by separate elements.

These and other variations of system 200 and the elements thereof are readily contemplated by one of ordinary skill in the art given the teachings of the present principles provided herein, while maintaining the spirit of the present principles.

FIG. 3 is a high-level block diagram showing an exemplary method 300 for extracting interpretable features for classification of multivariate time series from physical systems, in accordance with an embodiment of the present principles. Method 300 includes the following four steps: (301) multivariate shapelet extraction and classifier construction; (302) feature selection for determining the weights of classifiers; (303) weighted voting for classification; and (304) event extraction based on shapelets. Steps (303) and (304) can be done in parallel as they are independent. The steps will now be described in more detail as follows.

At step 301, process each time series dimension 361 separately to extract shapelets 362 therefrom and build a decision-tree classifier 351 therefor. Hence, for multivariate instances with n time series, we build n classifiers but we might extract more than n shapelets. The exact number depends on the data. The candidate features include subsequences extracted from the time series. The decision tree learning algorithm selects subsequences with high discriminative power, i.e. the ones that can be used to partition instances into their respective classes, e.g., normal versus abnormal, as shapelets. The discriminative power of a shapelet depends on the information gain from using it to partition instances during the decision tree learning phase. Hence, 351B represents the decision tree classifier, and 351A represents the shapelets that form the internal nodes of the classifier in 351B along with their fitness scores. In addition to associating a fitness score with each shapelet (i.e., feature), we define an overall fitness score for a decision tree. For example, the decision tree shown in FIG. 7 can separate the normal and abnormal instances into "pure" groups using two shapelets, and hence, its fitness score is 1. In practice, the fitness score for a decision tree can vary from 0 to 1. The fitness score for a decision tree can be interpreted as the "importance score" for the time series dimension (i.e., attribute) used for building the decision tree. Step 301 can be performed by, for example, the multivariate shapelet extractor and classifier constructor 210.

Further regarding step 301, in an embodiment, the underlying multi-dimensional time series data included labels. In such a case, the shapelet extraction can be performed using the labels.

At step 302, generate a pairwise similarity matrix between multivariate instances using shapelets from step 301 as intermediaries. We can apply a feature selection algorithm(s) to the similarity matrix to determine the weights for each shapelet feature first and then the weights for each classifier using the shapelet features. The feature selection algorithm can include, but is not limited to, minimum Redundancy Maximum Relevance (mRMR) and so forth. Step 302 can be performed by, for example, the similarity matrix generator 215 and the feature selector 220.

At step 303, receive from each classifier its decision for a new instance and then combine the decisions to produce the final verdict. In an embodiment, the decision can be given in the form of, for example, normal or faulty. Of course, the present principles are not limited to solely the preceding form and, thus, other forms of decision can also be used, while maintaining the spirit of the present principles. Note that classifiers receiving low weights in step 302 can be excluded from this step (step 303). Step 303 can be performed by, for example, the weighted voting device 230.

At step 304, interpret the different shapelets as "events" and find frequent sequential patterns between them. These patterns denote complex signatures for different classes of multivariate instances. The patterns can be useful for a variety of reasons as readily appreciated by one of ordinary skill in the art. For example, the patterns can be useful to domain experts for interpreting the results, i.e., why a certain instance is labeled faulty. Moreover, the patterns can be useful for root cause identification, i.e., which time series and the system components associated with them are responsible for the anomaly. The preceding pattern uses are merely exemplary and, thus, other pattern uses can also be exploited. Step 304 can be performed by, for example, the shapelet-based event extractor and pattern finder 240.

Thus, the present principles provide a novel approach for extracting shapelets from multivariate time series data. In an embodiment, we build a separate classifier for each dimension and use weighted voting (step 303 of method 300) for classification. We propose an innovative solution for learning these weights. In an embodiment, our solution for learning the weights involves converting the time series data into a vector where each entry represents the distance of this time series from a shapelet feature. Given these vectors, we can define a similarity matrix using metrics such as, for example, but not limited to, Euclidean distance. We note that step 304 of method 300 uses shapelets to define events that can be used for frequent (sequential) pattern mining. We are the first to interpret shapelets in this manner.

A further description will now be given of how the decision-tree classifier is built, in accordance with an embodiment of the present principles.

Figure 4:
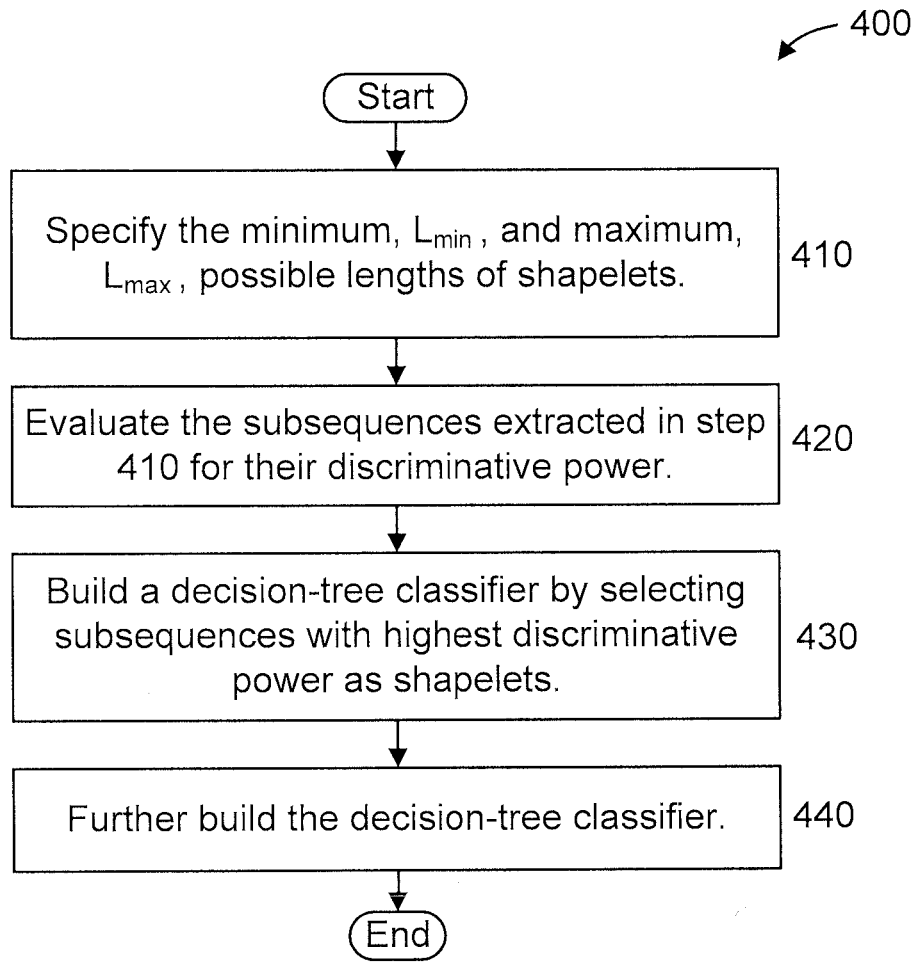
FIG. 4 is a flow diagram showing an exemplary method 400 for building a decision-tree classifier, in accordance with an embodiment of the present principles.

FIG. 4 shows an exemplary method 400 for building a decision-tree classifier, in accordance with an embodiment of the present principles.

At step 410, specify the minimum, $L_{min}$, and maximum, $L_{max}$, possible lengths of shapelets. Using a sliding window w within the interval $L_{min}$, to $L_{max}$, i.e., $w \in [L_{min}, L_{max}]$, we extract all subsequences of length w from a time series. For example, for a time series of length 100, using a sliding window w=10 will result in 91 (=100−10+1) subsequences. Some of these subsequences will eventually be selected as shapelets. Hence, if $L_{min}$=10 and $L_{max}$=11, then we will have 181 total subsequences (91 for w=10 and 90 for w=11).

At step 420, evaluate the subsequences extracted in step 410 for their discriminative power. This step makes use of class labels. For a particular subsequence, we compute its minimum distance from all the time series from the same class. E.g., if there are two classes, normal and abnormal with k time series in each class, then we will have two sets of distances corresponding to the normal and abnormal class. The discriminative power (also referred to as information gain) of a subsequence is a function of how well it can separate the normal and abnormal classes. FIG. 5 shows an exemplary first candidate subsequence 500 plotted by its distances from normal time series (in circles) and abnormal time series (in x's) on the real line. FIG. 6 shows an exemplary second candidate subsequence 600 plotted by its distances from normal time series (in circles) and abnormal time series (in x's) on the real line. Subsequence 500 has a higher discriminative power than subsequence 600 because for subsequence 500 we can find a threshold such that all normal time series distances are to its left and abnormal ones are to its right. It is not possible to do this in case of subsequence 600.

Figure 7:
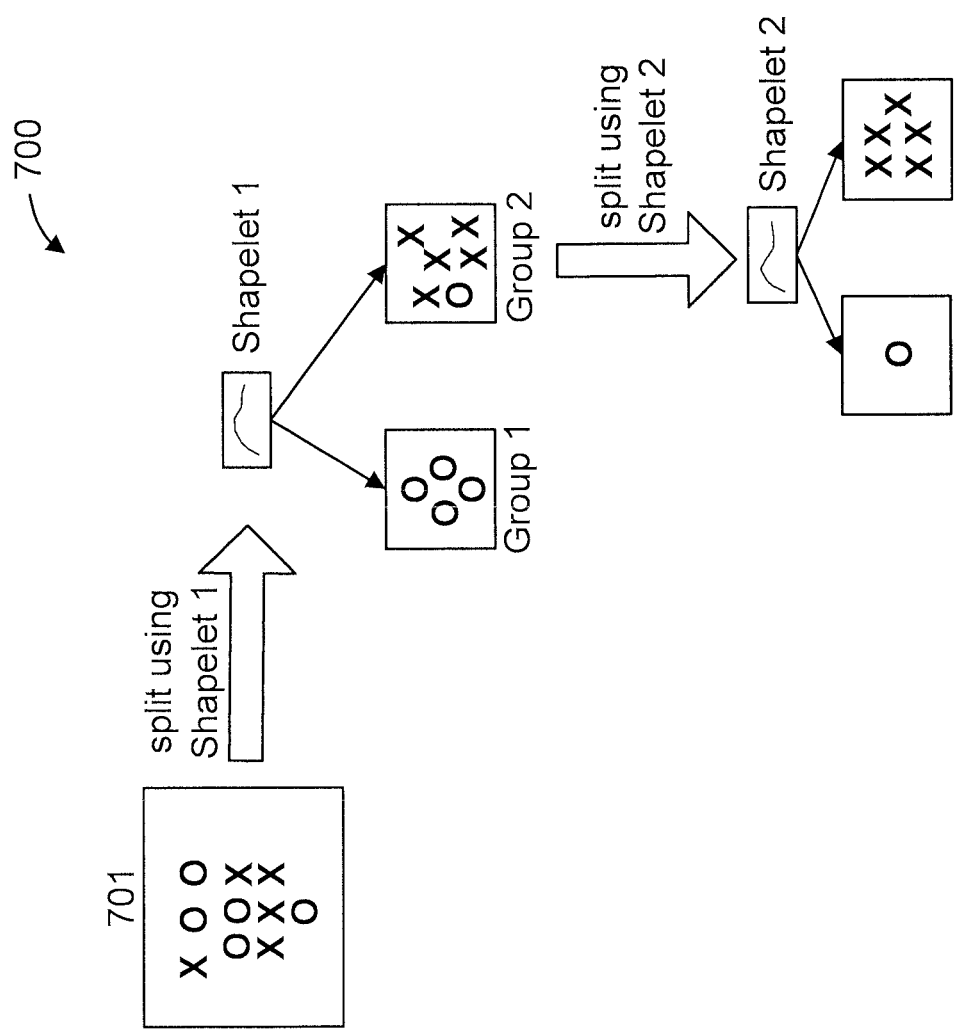
FIG. 7 is a block diagram showing an exemplary decision-tree 700 with two shapelets, in accordance with an embodiment of the present principles.

At step 430, build a decision-tree classifier by selecting subsequences with highest discriminative power as shapelets. Any decision tree learning algorithm can be used in accordance with the teachings of the present principles, while maintaining the spirit of the present principles. As an example, here we will pick subsequence 500 as a shapelet (over subsequence 600). Often, the decision-tree will include more than one shapelet. FIG. 7 shows an exemplary decision-tree 700 with two shapelets, in accordance with an embodiment of the present principles. Normal instances are shown using O's, and abnormal instances are shown using X's. In this example, the multivariate time series data 701 includes 5 normal instances and 5 abnormal instances. Shapelet 1, at the root of the decision tree, partitions the initial data into two groups, with one including 4 normal instances, and the other group including 5 abnormal and 1 normal instance. The decision tree picks Shapelet 2 to further split the second group into 5 abnormal instances and 1 normal instance.

At step 440, further build the decision-tree classifier. Note that the initial entropy of the dataset is 1. Shapelet 1 splits it into 2 groups. One group, the first group, includes only normal instances and hence, its entropy is zero. The second group includes 5 abnormal and 1 normal instances and, hence, its entropy is 0.39 (after adjusting for its smaller size of only 6 out of the original 10 instances). Thus the information gain or discriminative power of Shapelet 1 is 0.61 (=1−0.39). Shapelet 2 takes data with entropy of 0.39 and splits them into two "clean" groups with zero entropy. Hence, its information gain is 0.39. We define the information gain of a shapelet as its fitness score.

A description will now be given regarding some of the many attendant benefits/advantages provided by the present principles. Quite advantageously, the present principles enable learning weights for classifiers that takes correlation between features into account. This is more robust and less redundant, hence computationally efficient, than previous approaches.

A description will now be given regarding some of the many attendant competitive/commercial values of the solution provided by the present principles.

We provide a solution for handling multivariate time series data that can handle more cases than existing approaches. These new functionalities can be interpreted as a "higher quality" solution.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:
1. A method, comprising:
extracting shapelets from each of a plurality of time series dimensions of multi-dimensional time series data from one or more sensors in one or more physical systems;
building a plurality of decision-tree classifiers, one for each of the plurality of time series dimensions, responsive to the shapelets extracted therefrom;
generating a pairwise similarity matrix between respective different ones of the plurality of time series dimensions using the shapelets as intermediaries for determining similarity;
applying a feature selection technique to the pairwise similarity matrix to determine respective feature weights for each of shapelet features of the shapelets and respective classifier weights for each of the plurality of decision-tree classifiers that uses the shapelet features;
interpreting different ones of the shapelets as different events, and finding frequent sequential patterns between the different events, wherein the patterns denote complex signatures for different classes of multivariate instances; and
combining decisions issued from the plurality of decision-tree classifiers to generate a final verdict of classification for a time series dimension responsive to the respective feature weights and the respective classifier weights.
2. The method of claim 1, wherein said interpreting and finding steps form a step pair, and said step pair and said combining step are performed in parallel.

3. The method of claim 1, wherein said extracting step is performed to evaluate each of the plurality of time series dimensions in parallel.

4. The method of claim 1, wherein the plurality of time series dimensions have corresponding labels associated therewith, and the shapelets are extracted responsive to the corresponding labels.

5. The method of claim 1, wherein said generating step comprises converting the plurality of time series dimensions into respective vectors that represent a respective distance of a respective one of the plurality of time series dimensions from a respective one of a plurality of shapelet features, and wherein the pairwise similarity matrix is generated responsive to the respective vectors.

6. The method of claim 1, further comprising excluding, from said combining step, certain ones of the plurality of decision-tree classifiers having the respective classifiers weights below a threshold value.

7. The method of claim 1, wherein at least some of the shapelets have at least one of different lengths, different starting times, and different ending times.

8. A non-transitory article of manufacture tangibly embodying a computer readable program which when executed causes a computer to perform the steps of claim 1.

9. A system, comprising:
- a shapelet extractor for extracting shapelets from each of a plurality of time series dimensions of multi-dimensional time series data from one or more sensors in one or more physical systems;
- a processor-based decision-tree classifier builder for building a plurality of decision-tree classifiers, one for each of the plurality of time series dimensions, responsive to the shapelets extracted therefrom;
- a pairwise similarity matrix generator for generating a pairwise similarity matrix between respective different ones of the plurality of time series dimensions using the shapelets as intermediaries for determining similarity;
- a processor-based feature selector for applying a feature selection technique to the pairwise similarity matrix to determine respective feature weights for each of shapelet features of the shapelets and respective classifier weights for each of the plurality of decision-tree classifiers that uses the shapelet features;
- a shapelet-based event extractor and pattern finder for interpreting different ones of the shapelets as different events, and finding frequent sequential patterns between the different events, wherein the patterns denote complex signatures for different classes of multivariate instances; and
- a weighted voting device for combining decisions issued from the plurality of decision-tree classifiers to generate a final verdict of classification for a time series dimension responsive to the respective feature weights and the respective classifier weights.

10. The system of claim 9, wherein said shapelet extractor evaluates each of the plurality of time series dimensions in parallel.

11. The system of claim 9, wherein the plurality of time series dimensions have corresponding labels associated therewith, and the shapelets are extracted responsive to the corresponding labels.

12. The system of claim 9, wherein said pairwise similarity matrix generator converts the plurality of time series dimensions into respective vectors that represent a respective distance of a respective one of the plurality of time series dimensions from a respective one of a plurality of shapelet features, and wherein the pairwise similarity matrix is generated responsive to the respective vectors.

13. The system of claim 9, wherein said weighted voting device excludes from the combining certain ones of the plurality of decision-tree classifiers having the respective classifiers weights below a threshold value.

14. The system of claim 9, wherein at least some of the shapelets have at least one of different lengths, different starting times, and different ending times.

* * * * *